March 13, 1945. M. G. MURRAY 2,371,348
METHOD OF MAKING COMPOSITE TUBES
Filed Dec. 18, 1942
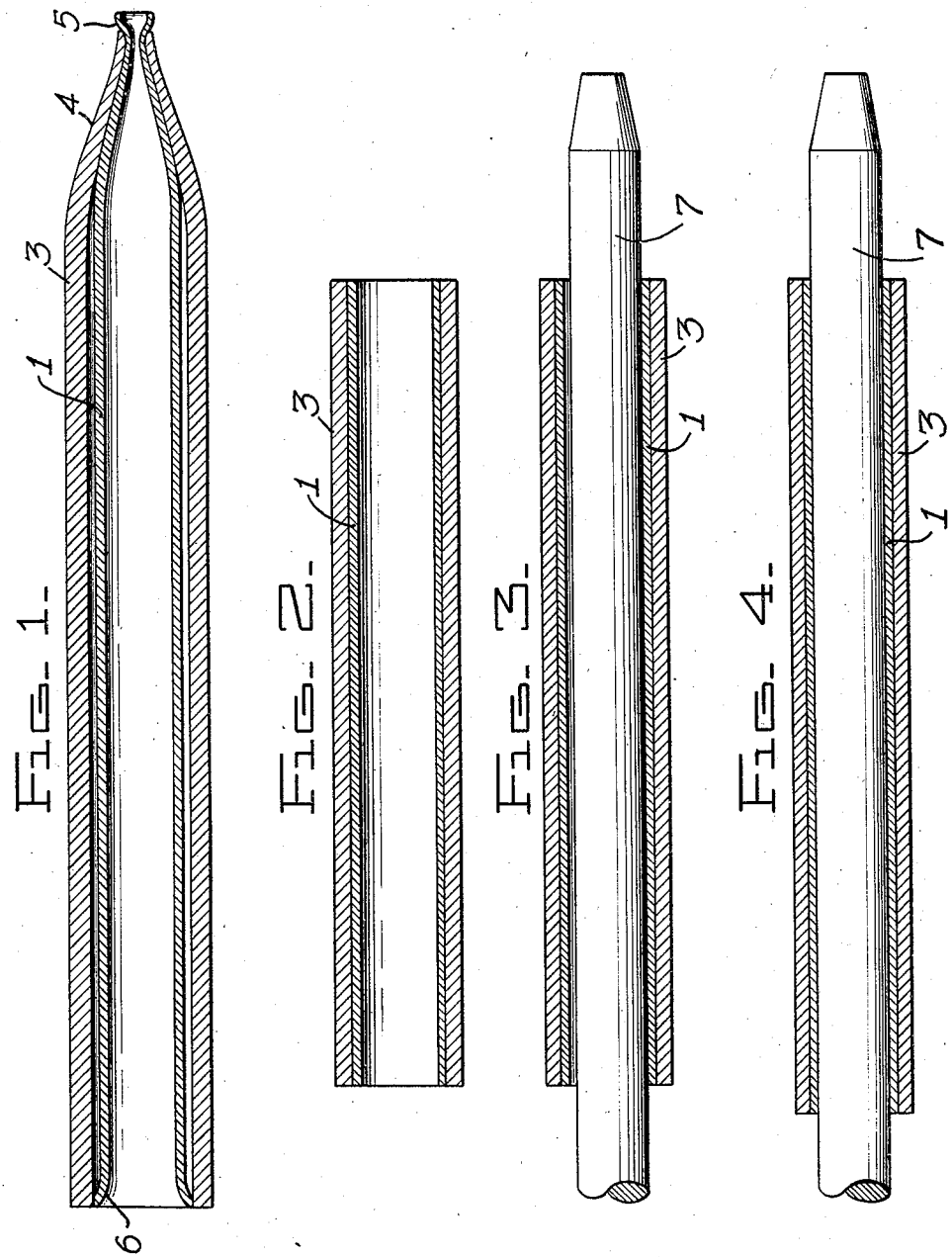
INVENTOR.
MALCOLM G. MURRAY,
BY John E. Jackson
ATTORNEY Patented Mar. 13, 1945

2,371,348

UNITED STATES PATENT OFFICE 2,371,348

METHOD OF MAKING COMPOSITE TUBES

Malcolm G. Murray, Ellwood City, Pa., assignor to National Tube Company, a corporation of New Jersey Application December 18, 1942, Serial No. 469,447

7 Claims. (Cl. 29—188)

This invention relates to a method of making composite tubes having the inner part of said tube of different metal than the outer part.

It is common to form composite tubes by telescoping a tube of one metal coated with a bonding agent within a tube of different metal and then reducing the assembly to unite the two parts. During the process, the assembled composite tube is heated to a relatively high temperature and due to differences in the thermal-coefficient of expansion of the two metals, there is a tendency for the two metals to separate when cooled.

It is an object of this invention to so control the shrinkage that the surfaces will remain bonded after cooling.

This, and other objects will be more apparent after referring to the following description and attached drawing, in which:

Fig. 1 is a view showing the two tubes telescoped together;

Fig. 2 is a view showing the tubes after they have been drawn tightly together;

Fig. 3 is a view showing the tubes about to be hot rolled; and

Fig. 4 is a view of the composite tube after it has been rolled.

The invention will be described as applied to making a composite tube having a steel outer tube and a copper inner tube. However, it will be understood that the method is also suitable for making a composite tube of any two metals having different thermal-coefficients of expansion.

Referring more particularly to the drawing the reference numeral 1 indicates a copper tube having a bonding agent such as tin on the outer surface thereof. The tube 1 is telescoped within a steel tube 3 having an interior diameter slightly greater than the outer diameter of the copper tube. The assembled tubes are then pointed as indicated at 4 in Fig. 1 and the outer end of the copper tube expanded at 5 to prevent relative longitudinal movement of the tubes. The other end of the copper tube is flared at 6 to keep out foreign matter from between the tubes. The two tubes are then cold drawn or rolled tightly together and the point cut off to obtain the assembly shown in Fig. 2. The composite tube is then heated to a temperature of about 1600 to 1700° F. and a cold steel bar 7, of slightly less diameter than the inside of the tube inserted therein. The tube is rolled down or drawn tightly on the bar and allowed to cool. As the steel tube cools, it presses against the copper from the the outside while the cold bar 7 is heating up and expanding against the copper from the inside. In this manner a uniform and strong bond is formed between the tubes. The bar 7 is then loosened from the tube 1 by cross rolling and removed.

While a preferred procedure for making the invention available has been described, it will be understood that various modifications and adaptations may be made without departing from the scope of the attached claims.

I claim:

1. The method of making a composite tube by uniting the outside surface of one tube to the inner surface of a second tube, said tubes having different coefficients of expansion, which comprises applying a bonding agent to one of the surfaces to be united, telescoping one tube within the other, cold reducing the tubes to draw them tightly together with the bonding agent therebetween, heating the tubes to fuse the bonding agent, inserting a cold bar into said inner tube while the tubes are still hot, reducing said hot tube assembly into tight engagement with the bar, permitting the tubes to cool, part of the heat from said tubes being transferred to said bar to cause it to expand against the inner tube to keep the tubes united, and removing the bar from the cooled assembly.

2. The method of making a composite tube by uniting the outside surface of one tube to the inner surface of a second tube, said tubes having different coefficients of expansion, which comprises applying a bonding agent to one of the surfaces to be united, telescoping one tube within the other, cold drawing the tubes to draw them tightly together with the bonding agent therebetween, heating the tubes to fuse the bonding agent, inserting a cold bar into said inner tube while the tubes are still hot, rolling said hot tube assembly into tight engagement with the bar, permitting the tubes to cool, part of the heat from said tubes being transferred to said bar to cause it to expand against the inner tube to keep the tubes united, and removing the bar from the cooled assembly.

3. The method of making a composite tube by uniting the outside surface of a copper tube to the inner surface of a steel tube which comprises applying a bonding agent to one of the surfaces to be united, telescoping the copper tube within the steel tube, cold reducing the tubes to draw them tightly together with the bonding agent therebetween, heating the tubes to fuse the bonding agent, inserting a cold bar into said copper tube while the tubes are still hot, reducing said hot tube assembly into tight engagement with the bar, permitting the tubes to cool, part of the heat from said tubes being transferred to said bar to cause it to expand against the copper tube to keep the tubes united, and removing the bar from the cooled assembly.

4. The method of making a composite tube by uniting the outside surface of a copper tube to the inner surface of a steel tube which comprises applying a bonding agent to one of the surfaces to be united, telescoping the copper tube within the steel tube, cold drawing the tubes to draw them tightly together with the bonding agent therebetween, heating the tubes to fuse the bonding agent, inserting a cold bar into said copper tube while the tubes are still hot, reducing said hot tube assembly into tight engagement with the bar, permitting the tubes to cool, part of the heat from said tubes being transferred to said bar to cause it to expand against the copper tube to keep the tubes united, and removing the bar from the cooled assembly.

5. The method of making a composite tube which comprises applying tin to the outside surface of a copper tube, telescoping said tube within a steel tube, cold drawing the tubes tightly together with the tin therebetween, heating the tubes to a temperature of approximately 1600 to 1700° F. to fuse the bonding agent, inserting a cold bar of slightly less diameter than the inside of the said copper tube into said copper tube while the tubes are still hot, rolling the hot tube assembly into tight engagement with the bar, permitting the tubes to cool, part of the heat from said tubes being transferred to said bar to cause it to expand against the copper tube to keep the tubes united, and removing the bar from the cooled assembly.

6. The method of making a composite tube which comprises applying tin to the outside surface of the copper tube, telescoping said tube within a steel tube of substantially the same length, pointing one end of the assembly, flaring the other end of said copper tube, cold drawing the tubes to draw them tightly together with the tin therebetween, cutting off the pointed end, heating the assembly to a temperature of approximately 1600 to 1700° F. to fuse the tin, inserting a cold steel bar of slightly less diameter than the inside of said copper tube into said copper tube while the tubes are still hot, rolling the hot tube assembly into tight engagement with the bar, permitting the tubes to cool, part of the heat from said tubes being transferred to said bar to cause it to expand against the copper tube to keep the tubes united, loosening the bar by cross-rolling, and then removing the bar from the cooled assembly.

7. In the method of making a composite tube in which telescoped tubes having different coefficients of expansion with a bonding agent therebetween are united by applying pressure and sufficient heat to fuse the bonding agent, the improvement which comprises inserting a cold bar into said inner tube while the tubes are still hot, reducing said hot tube assembly into tight engagement with the bar, permitting the tubes to cool, part of the heat from said tubes being transferred to said bar to cause it to expand against the inner tube to keep the tubes united, and removing the bar from the cooled assembly.

MALCOLM G. MURRAY.